(12) United States Patent
Chaudry et al.

(10) Patent No.: US 6,577,616 B1
(45) Date of Patent: Jun. 10, 2003

(54) SYSTEMS AND METHODS FOR IMPLEMENTING LARGE CDMA CELL SIZES

(75) Inventors: Shahid Rasul Chaudry, Ottawa (CA); Muhammad Khaledul Islam, Nepean (CA); Hong Ren, Nepean (CA); Azeem Ahmad, Plano, TX (US); Thomas Leonard Trevor Plestid, Ottawa (CA); Neil McGowan, Stittsville (CA); James Russell Weisert, Calgary (CA); Brian Douglas Troup, Garland, TX (US); David Andrew Tetreau, Calgary (CA); David Allan Boettger, Singapore (SG)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/473,712

(22) Filed: Dec. 29, 1999

(51) Int. Cl.⁷ .............................................. H04B 7/216
(52) U.S. Cl. ........................ 370/342; 370/331; 455/561
(58) Field of Search ................................ 455/434, 515, 455/422, 67.6, 436, 444, 561; 370/331, 332, 333, 342, 328; 375/130, 140, 145

(56) References Cited

U.S. PATENT DOCUMENTS

| | | | | |
|---|---|---|---|---|
| 5,758,090 A | | 5/1998 | Doner .................... | 395/200.66 |
| 6,161,022 A | * | 12/2000 | Hwang et al. .............. | 370/342 |
| 6,169,887 B1 | * | 1/2001 | Cordell et al. ............. | 370/342 |
| 6,192,247 B1 | * | 2/2001 | Dillon et al. ............... | 455/446 |
| 6,212,405 B1 | * | 4/2001 | Jiang et al. ................. | 370/337 |
| 6,304,759 B1 | * | 10/2001 | Jiang et al. ................. | 370/335 |
| 6,363,261 B1 | * | 3/2002 | Raghavan .................... | 370/335 |
| 6,370,397 B1 | * | 4/2002 | Popovic et al. ............. | 370/342 |

FOREIGN PATENT DOCUMENTS

| | | | |
|---|---|---|---|
| EP | 0984643 A2 | 3/2000 | ............ H04Q/7/30 |
| WO | WO 9610873 | 4/1996 | ............ H04B/7/26 |
| WO | WO 0052850 | 9/2000 | ........... H04B/7/216 |

* cited by examiner

*Primary Examiner*—Nguyen T. Vo

(57) ABSTRACT

Methods and apparatuses are provided for CDMA (code division multiple access) access availability to a large cell area, and for traffic channel establishment. A group of cell site modems are configured to look for access attempts generated in respective complete and/or sectorized circular or annular shaped areas centered at the center of the cell area, the areas collectively covering the cell area. To achieve this, each cell site modem has a local clock and the local clock within the first of the cell site modems is synchronized with a standard network time, and the local clock of each of the subsequent cell site modems is offset by a respective delay with respect to the standard network time which causes the cell site modem to search within its respective annular shaped area. A cell site modem is also made available as a traffic cell site modem and is operable to have its traffic acquisition search window centered at a location of an access attempt. Alternatively, a plurality of traffic cell site modems may be provided, each having dedicated circular or annular coverage areas within the cell. The traffic cell site modems also preferably have a local clock which may be synchronized, either to a standard network time, or to a respective delay which causes it to search in its respective area. Methods and for handing off between circular and annular shaped traffic coverage areas are also provided.

22 Claims, 6 Drawing Sheets

SYSTEMS AND METHODS FOR IMPLEMENTING LARGE CDMA CELL SIZES

FIELD OF THE INVENTION

The invention relates to systems and methods for implementing large CDMA cell sizes, particularly for application in systems which, due to a search window size which limits searching capabilities, can only establish wireless links within cells of a fixed maximum size.

BACKGROUND OF THE INVENTION

CDMA (code division multiple access) communications systems are currently designed to accommodate a maximum cell size radius of about 62.5 km. For certain applications, such as in large service areas and in coastal service areas, it would be advantageous to be able to provision for larger cell sizes, and to be able to establish traffic channels between mobile stations and base stations within such larger cells.

In order to establish a session in a large cell or any cell for that matter, a mobile station must first "acquire" a base station. Existing approaches to base station acquisition are still applicable in large cells. Mobile stations search for base stations within a CDMA communications system by looking for an identification code, such as the IS-95 PN (pseudo-random number) short codes (in-phase code and quadrature code), transmitted by every base station, different sectors of different base stations sending the same short code with a different time shift, known as a PN offset, which provides a unique base station sector identifier. After finding a transmitted PN code, the mobile station reads a SYNC channel which identifies the particular PN offset. Mobile stations on power-up acquire their time reference on the basis of the PN offset of the first base station they make contact with. This time reference is delayed by the RF propagation delay between the base station and the mobile station. The mobile station reads in another channel (the paging channel for example) information necessary for it to know how to acquire the system. This will include how to register, system parameters, call processing information, and neighbour list etc. After a mobile station acquires its time reference and reads the necessary information from the paging channel, the mobile station sends an access channel message to the base station which is aligned with the mobile station's time reference. This access channel message will be received by the base station after a round trip delay representative of the sum of the time for the PN code to travel from the base station to the mobile station and the time for the mobile station's access channel message to return from the mobile station to the base station.

In current base stations, CSMs (cell site modems) are provided to interact with mobile stations. These CSMs search for the access channel message sent by the mobile station within a fixed access search window. It is common to interchangeably refer to window sizes in units of chip durations (a chip is the unit of code spreading for CDMA) or in terms of a round trip distance. For CDMA, one chip is approximately 0.8 $\mu$s in duration, and the "chip distance" is approximately 244 meters. In some existing systems the access search window is 125 km (512 chips) meaning that the base station will only see signals sent from mobile stations within a radius of 62.5 km (or 125 km round trip). An existing chip produced by Qualcomm which is in widespread use has this constraint, and in fact every chip will have some such physical constraint. Due to the physical nature of the problem, there is a need to limit the access window size.

It would be advantageous to be able to use existing mobile stations in environments with cells having large radii for interoperability reasons, and in particular in an environment in which existing cell site modems can be employed.

SUMMARY OF THE INVENTION

It is an object of the invention to obviate or mitigate one or more of the above identified disadvantages.

Embodiments of the invention provide methods and apparatuses for providing CDMA (code division multiple access) access availability to a cell area, and for providing traffic channel establishment.

In one broad aspect, a plurality of cell site modems are configured to look for access attempts generated in respective circular or annular shaped areas centered at the centre of the cell area, the areas collectively covering the cell area.

The cell area might for example have a total radius R, and each cell site modem may be capable of searching over a respective range of distances. Preferably, a first of the cell site modems is configured to look within a circle of radius W, and subsequent cell site modems are configured to look within respective annular shaped areas which are sequentially increasing in diameter. Preferably, the annular shaped areas are substantially non-overlapping, and are of width W except for an outer most annular region which is of whatever width is required to completely cover the cell area.

Preferably, each cell site modem has a local clock and the local clock within the first of the cell site modems is synchronized with a standard network time, and the local clock of each of the subsequent cell site modems is offset by a respective delay with respect to the standard network time which causes the cell site modem to search within its respective annular shaped area.

Each of the cell site modems may be configured to look for an access attempt coded with an identical long code mask. Alternatively, some of the cell site modems may be configured to look for an access attempt coded with respective different long codes mask.

A cell site modem is preferably also made available as a traffic cell site modem and is operable to have its traffic acquisition search window centered at a location of an access attempt. Alternatively, a plurality of traffic cell site modems may be provided, each having dedicated circular or annular coverage areas within the cell. The traffic cell site modems also preferably have a local clock which may be synchronized, either to a standard network time, or to a respective delay which causes it to search in its respective area.

In another broad aspect, the invention provides an apparatus for providing CDMA (code division multiple access) traffic availability to a cell area. The apparatus has at least one cell site modem operable to look for traffic generated in respective configurable circular or annular shaped areas centered at the centre of the cell area. Alternatively, the areas covered by the cell site modems for traffic might be fixed and predetermined such that they permanently collectively cover the cell area.

The search windows of the traffic cell site modems may be controlled by adjustment of a delay to their local clocks, as was the case for the access cell site modems.

Another embodiment of the invention provides methods and systems for handing off between circular and annular shaped traffic coverage areas. One such method involves establishing an initial traffic acquisition search window in a cell site modem such that a mobile station's energy is substantially at the centre of the search window, monitoring the position of a mobile station's energy within the initial traffic acquisition search window, and when the mobile station's energy becomes near an edge of the traffic acquisition search window, resynchronizing the cell site modem by positioning the search window so that the mobile station's energy again falls substantially in the centre of the range available to the traffic acquisition search window thereby performing a radial handoff.

Monitoring the position of a mobile station within the initial traffic acquisition search window is preferably done by monitoring a round trip delay between the cell site modem and the mobile station.

Resynchronizing the cell site modem by positioning the traffic acquisition search window so that the mobile station's energy again falls substantially in the centre of the range available to the traffic search window is preferably done by resynchronizing the cell cite modem with a timing offset selected to appropriately relocate the search window.

Preferably, such a radial handoff is triggered when the mobile station's round trip delay indicates the mobile station's energy is within a predetermined distance from the edge of the traffic acquisition search window.

Another embodiment of the invention provides a method of providing traffic coverage to a large cell in which permanent traffic rings within the large cell, and dedicated traffic channel CSMs are assigned to each of the traffic rings. When a mobile station moves from one ring to another, a handoff between the respective cell site modems is performed. A base station adapted to implement such a method is provided which consists of a plurality of cell site modems, with at least one cell site modem dedicated to provide traffic coverage to each of a plurality of permanent traffic rings defined within the large cell, a round trip delay tracker for tracking a round trip delay between the base station and a mobile terminal and determining when a mobile terminal is moving out of a previous traffic ring into a new traffic ring, and a radial handoff controller for switching the mobile terminal from a cell site modem in its previous ring to one in its new traffic ring.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
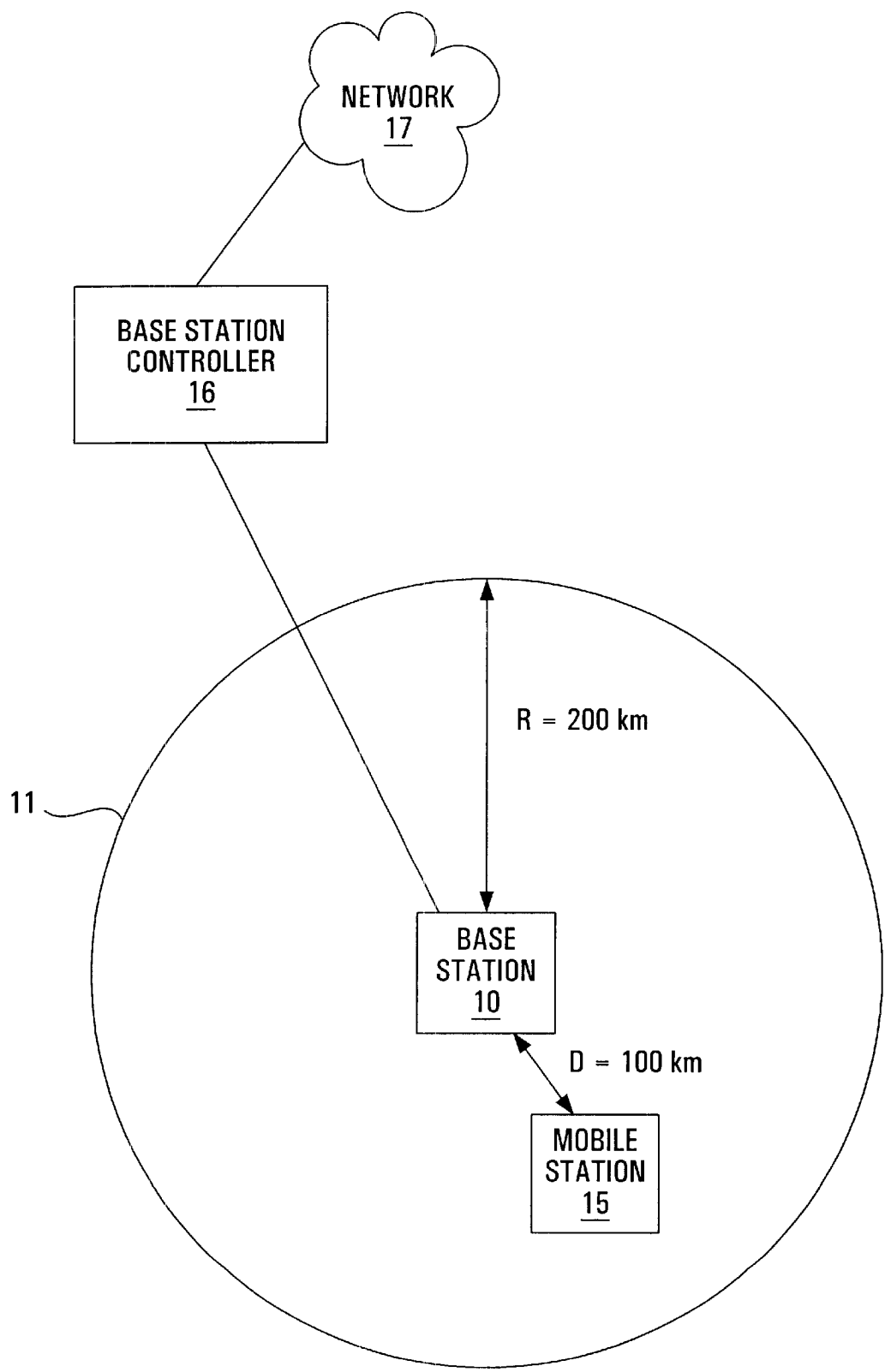
FIG. 1 is an example deployment scenario.

The problem to be overcome by an embodiment of the invention will be described in the context of a particular deployment scenario which is illustrated in FIG. 1. There is a base station 10, providing service to a cell area 11, the cell size for the base station 10 being much larger than conventionally used, for example having a radius R=200 km. The base station 10 is shown connected to a control node, such as a base station controller 16 which is connected to the rest of a network 17. Also shown is a mobile station 15 in a position within the cell 11 of the base station 10 at a distance D=100 km from the base station 10. There would also be other base stations (not shown) having their own cells.

In CDMA, every base station transmits using a PN code which is the same except for the fact that different base stations transmit the PN code offset by a different amount. The PN code is a deterministic "short code" which repeats every 26.6 ms and has a length of 32768 chips. For IS-95, the chip rate is 1.2288 MHz, each chip is approximately 0.8 $\mu$s in duration, and the "chip distance" is approximately 244 meters, this being the distance light travels during a chip's duration. 512 different PN code shifts or offsets have been defined, each PN code shift shifted by an additional 64 chips with respect to the previous. A PN code having a PN offset of 0 consists of the PN code without any shift. More generally, a PN code having a PN offset of k, referred to hereinafter as "PN-k" where k=0 to 511, identifies the PN code shifted by 64 multiplied by k chips. One of these shifted PN codes is transmitted by each base station (by each sector if sectorized) with respect to a time reference which is uniform for all base stations and referred to as UTC (Universale Temps Coordonné, Universal Coordinated Time) time. This time reference is obtained by each base station from a global positioning system for example. The shift of the PN code transmitted by a given base station can be used to identify the particular base station. Each base station transmits a Sync channel which is aligned with the PN code, and which identifies the PN offset.

For the example of FIG. 1, it is assumed that base station 10 transmits with PN-0, and that the mobile station 15 acquires the base station's PN code transmission after a one way 100 km transmission delay, and that the MS 15 then establishes its time reference with respect to this, namely UTC+100 km/c, where c is the speed of light.

Figure 2:
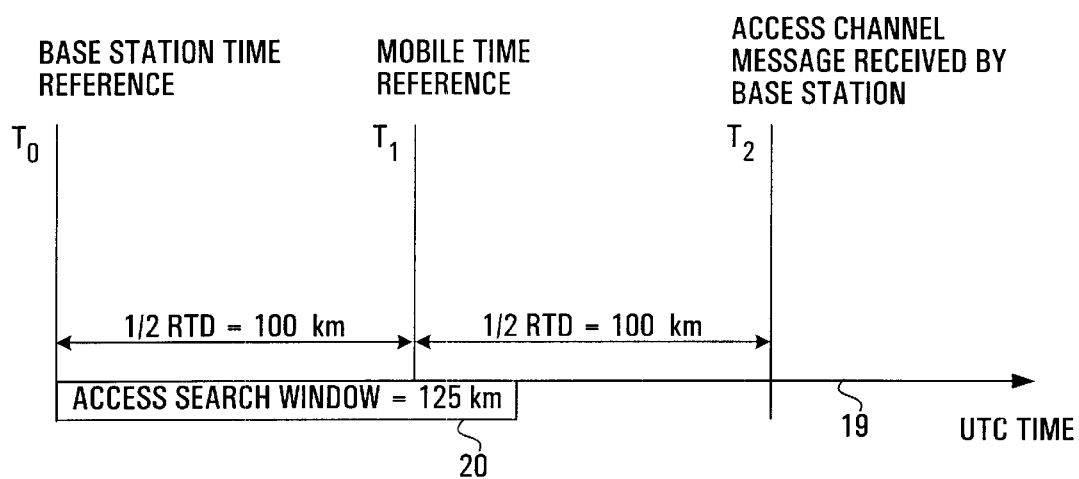
FIG. 2 is a timing diagram for an access attempt by a mobile station within a cell containing a conventional base station and having a large radius in accordance with the deployment scenario of FIG. 1.

A timing diagram for this example is shown in FIG. 2 which will be explained with continued reference to FIG. 1. In the diagram, a horizontal axis 19 labeled "UTC time" represents the common standard time reference used by all of the base stations including base station 10, measured from some particular zero time reference $T_0$ in UTC time. All base stations including base station 10 have the same zero time reference $T_0$. The mobile station 15 acquires the base station 10 at time $T_1$, after one half a round trip delay, namely a 100 km/c delay, and establishes its time reference. It then sends an access channel message which is received by the base station 10 at $T_2$ after a further one half round trip delay with respect to the mobile station time reference, namely a 200 km/c delay with respect to the base station time reference. The base station 10 places its search window indicated at 20 about its own zero time reference $T_0$. The search window has a limited width, and is assumed for this example to be 125 km/c. This means it looks for access channel messages received with up to a 125 km/c delay, and that it will not find the message arriving at $T_2$ with a 200 km/c delay. The invention provides solutions to this problem which allow the base station 10 to see the access channel message, and to establish a traffic channel to the mobile station 15.

Figure 3:
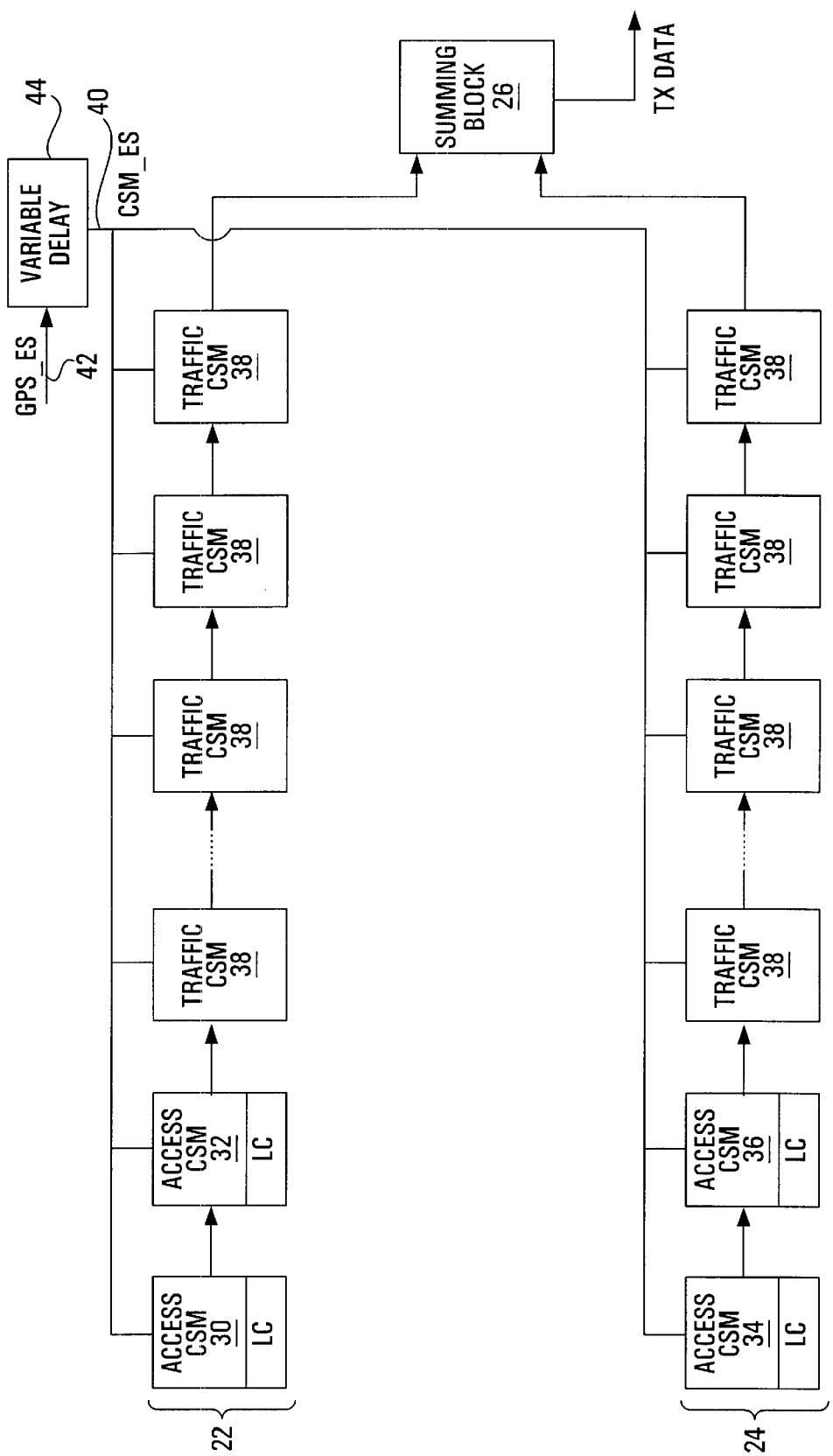
FIG. 3 is an example of an arrangement of cell site modems according to an embodiment of the invention.

An example of a base station design for implementing a first embodiment of the invention is shown in FIG. 3 in which two chains 22,24 of 12 CSMs (each implemented with a separate ASIC for example, only six shown in each chain) are connected serially and feeding into a summing block 26. The CSMs are divided into overhead CSMs (pilot, sync, paging and access) and traffic CSMs. This invention deals with only access CSMs and traffic CSMs. Access CSMs are reserved to handle access attempts from mobile stations, while traffic CSMs are reserved for traffic channels with mobile stations. In the illustrated example, it is assumed that four CSMs 30,32,34,36 are access CSMs while the remaining CSMs are traffic CSMs, identically indicated by 38. Each CSM 30,32,34,36,38 has its own internal clock which is synchronized on the basis of an even second signal 40. In the illustrated example, the CSMs 30,32,34,36,38 derive their time from a common even second signal 40 labeled CSM_ES which is derived from a GPS clock based even second signal 42 labeled GPS_ES (i.e. UTC time). A variable delay block 44 is provided which is capable of producing CSM_ES 40 with a variable delay with respect to GPS_ES 42. The purpose of this delay is described in detail below. The variable delay block 44 and the summing block 26 might be implemented in a microprocessor for example.

The mobile station 15 accesses the system using one or more "public long code masks". For the purpose of this example it is assumed that there is only one such public long code mask referred to herein as "LC". In the event there were more than one, the number of long code masks might be identified in the paging channel information which the mobile station 15 accesses prior to sending its access channel message.

Reverse traffic channels, once established are separated by different large code masks. Collisions will occur if access attempts overlap in time and space.

As discussed above, due to the limited size of the search window in the access CSMs 30,32,34,36, conventional systems search for the public long code mask too soon, before it arrives from the distant mobile station 15. According to an embodiment of the invention, a solution to this problem is provided which requires no change whatsoever to mobile station 15.

Rather than each CSM searching with respect to the common UTC time based CSM_ES which would allow a search window of 62.5 km, the searching responsibility of a larger cell radius (200 km in our example) is divided between separate CSMs assigned to respective search windows which collectively make up the larger cell radius of 200 km.

Figure 4:
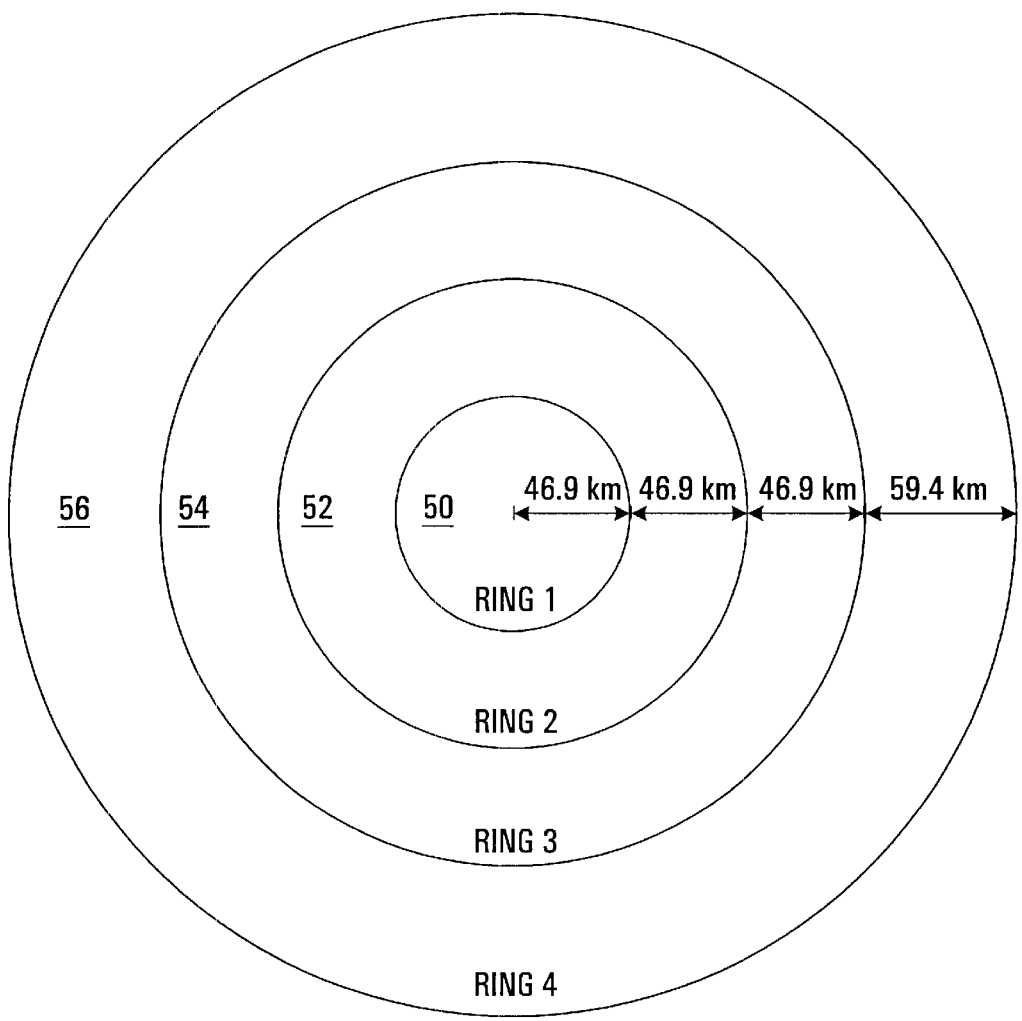
FIG. 4 is an illustration of access rings used by the cell site modems of FIG. 3.

A particular example of such a division of a 200 km cell will now be provided. The rationale for the particular search window parameters used in this example is presented later. Thus, for our example, referring back to FIG. 3, a first access CSM 30 is assigned to search for a version of LC from 0 to 93.8 km (representing a one way distance of 0 to 46.9 km). A second access CSM 32 is assigned to search for LC2 from 93.8 km to 187.5 km (representing a one way distance between 46.9 and 93.8 km). A third access CSM 34 is assigned to search for a version of LC from 187.5 km to 281.2 km (representing a one way distance between 93.8 km and 140.6 km), and a fourth access CSM 36 is assigned to search for a version of LC from 281.2 km to 400 km (representing a one way distance between 140.6 km and 200 km). The division of a 200 km extended cell into rings in this manner is shown in FIG. 4. The first access CSM 30 performs searching within ring 1 50, the second access CSM 32 performs searching within ring 2 52, the third access CSM 34 performs searching within ring 3 54, and finally, the fourth access CSM 36 performs searching within ring 4 56.

In a preferred embodiment, this can be achieved without modifying the access CSMs 30,32,34,36 by simply sending each of the CSMs involved a different time reference. By sending the first access CSM 30 the regular time reference without delay, it will centre its search window to look for mobile stations within a circle of radius 46.9 km. By sending the second access CSM 32 a time reference delayed by 6×64 chips=312.5 $\mu$s, it will centre its search window to look for mobile stations within an annular shaped area between 46.9 km to 93.8 km. By sending the third access CSM 34 a time reference delayed by 12×64 chips=625 $\mu$s, it will centre its search window to look for mobile stations within an annular shaped area between 93.8 km to 140.6 km. Finally, by sending the fourth access CSM 36 a time reference delayed by 18×64 chips=937.5 $\mu$s, it will centre its search window to look for mobile stations within an annular shaped area between about 140.6 km to 200 km. The fourth access CSM 36 should be allocated a larger search window width such that it searches from 140.6 to 200 km.

Preferably, the timing offsets are round trip delays measured in the granularity of PNs, i.e. in units of 64 chips or 15.6 km, equivalently 7.8125 km of cell radius.

The following rules have been applied in defining the above ring sizes and access search widths, but other rules may alternatively be employed:

k=number of rings;

m=cell diameter in chip/8 units;

x=round to nearest integer [m/(512 k)]=difference in offset between rings in units of 64 chips;

n=timing offset for the ith of the k rings, equal to xi, where i=0 to (k−1), in units of 64 chips;

AASW=Access acquisition search width for first k−1 rings is 512x−1 in units of chip/8; and AASW for the last ring is m−512 (k−1)x in units of chip/8.

For our example, k=4=number of rings, m based on cell size of 200 km=13104 chips, x=round [13104/(512*4)]=6, and the values of n, AASW, and the resulting search range are summarized in the following table:

| Ring Number | N | AASW | Radial Search Range |
|---|---|---|---|
| 1 | 0 | 3071 | 0 to 46.9 km |
| 2 | 6 | 3071 | 46.9 to 93.8 km |
| 3 | 12 | 3071 | 93.8 km to 140.6 km |
| 4 | 18 | 3888 | 140.6 km to 200 km |

In the event that as is the case in some designs and as is the case for our example of FIG. 3, a default situation exists that the same even second signal CSM_ES is distributed to all of the CSMs, in order to distribute different even seconds to different CSMs, a different even second signal can be distributed to all the CSMs, with all but one of the CSMs being instructed to resync to the new even second signal. Depending upon a system's design, the remaining CSMs may generate alarms which should be masked. By assigning CSMs in this manner, one of the CSMs will find a mobile station anywhere within the base station's cell.

More generally, to solve the problem of searching for access attempts in large cells, a plurality of cell site modems may be configured to look for access attempts generated in respective circular or annular shaped areas centred at the centre of the base station's cell, the areas collectively covering the cell area.

For example, if the cell has a radius R, and each cell site modem has a search window capable of searching over a range of distances W, a first of said cell site modems may be configured to look within a circle of radius W, and subsequent cell site modems may be configured to look within respective annular shaped areas which are sequentially increasing in diameter. Preferably the annular shaped areas are substantially non-overlapping, and are of thickness W except for an outer most annular region which is of whatever thickness is required to completely cover the cell.

Traffic Channel Modifications

Referring again to FIG. 3 (although the same comments apply with reference to FIG. 5) once one of the access CSMs 30,32,34,36 has identified the access channel message, a traffic CSM 38 is assigned to handle the traffic channel to the mobile station 15. In order that the traffic CSM 38 searches for traffic at the right time offset from UTC, it may need to be passed a shifted even second time reference as discussed below. The traffic CSMs 38 typically have two search windows, a traffic acquisition search window, and a traffic demodulation search window which is much smaller than the traffic acquisition search window for efficiency purposes.

The variable delay block 44 applies a variable delay version of CSM_ES to the traffic CSM 38 depending on which access CSM 30,32,34,36 received the access attempt from the mobile station 15. More particularly, the variable delay applied for the traffic CSM 38 is the total round trip delay for the origination attempt, this being equal to the delay applied to the particular access CSM's 30,32,34,36 time reference plus the round trip delay between the base station 10 and the mobile station 15 from the perspective of the particular access CSM which can be computed using conventional means, such as using finger offset data for example. For example, if the access CSM 32 dedicated to ring 2 52 in FIG. 4 receives an origination attempt from the mobile station 15, then after calculating the round trip delay of the signal received by the access CSM, the delay block 44 adds 93.8 km/c to the round trip delay to produce a composite round trip delay value. The composite round trip delay value is used to generate a CSM_ES signal used to initialize the traffic CSM 38. In this way the traffic CSM ensures that the mobile is in the centre of its traffic searcher.

Figure 5:
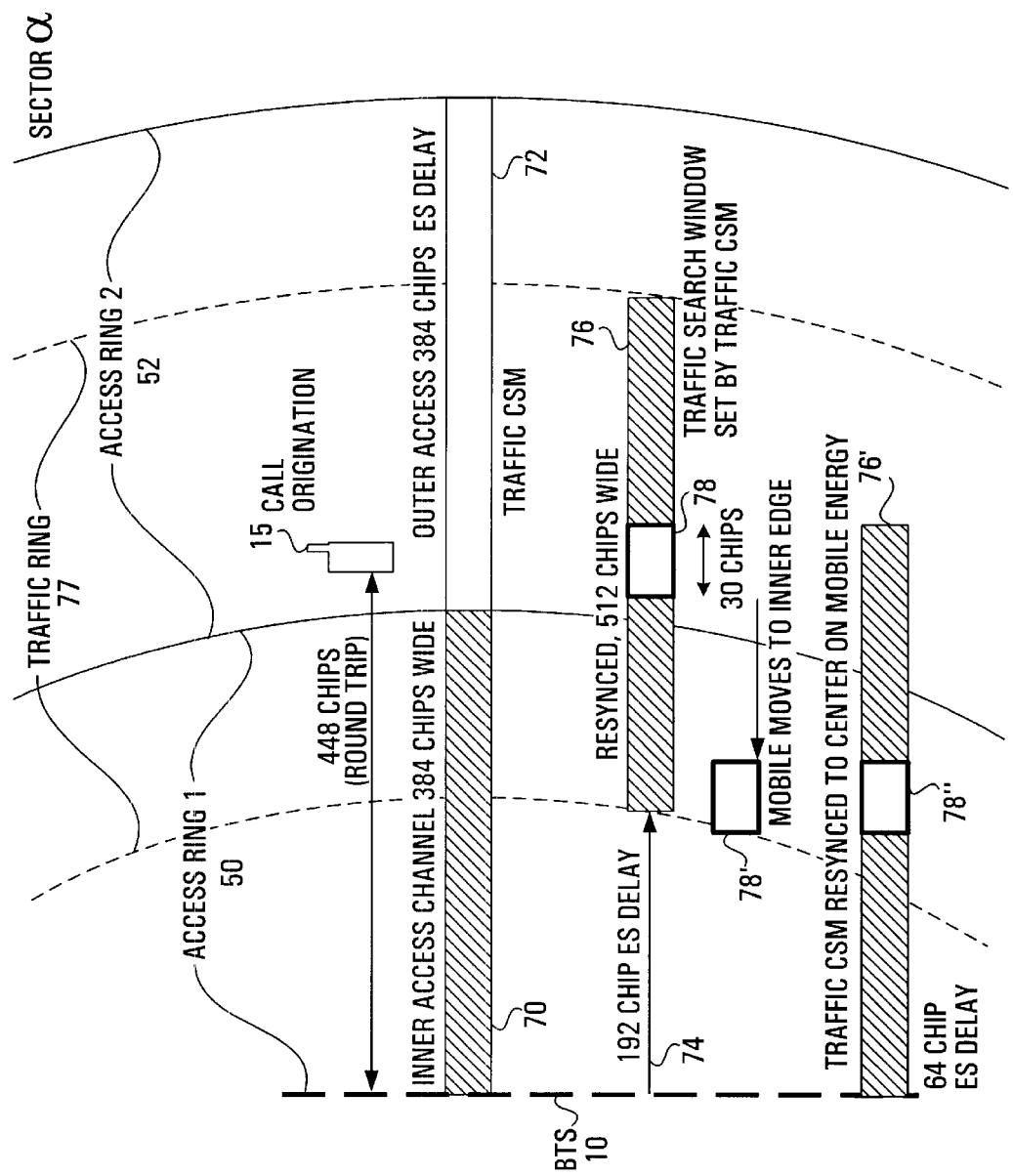
FIG. 5 is a detailed view of a portion of FIG. 4 illustrating traffic cell site modem setup and radial handoff.

Referring now to FIG. 5 more details of this example will be provided. FIG. 5 is detailed scenario in the context of the access rings of FIG. 4, in which two access rings ring 1 50 and ring 2 52 are shown. The base station 10 is shown at the centre of the rings, and the mobile station 15 is shown moving within ring 2 52. The access CSM search window is indicated at 70 for ring 1 50, and the access CSM search window is indicated at 72 for the ring 2 52, each of the access CSM search windows being 384 chips wide as in the above example. It is noted that the traffic ring does not need to be the same size as the access rings and for this example, we assume traffic rings are 512 chips wide.

Figure 6:
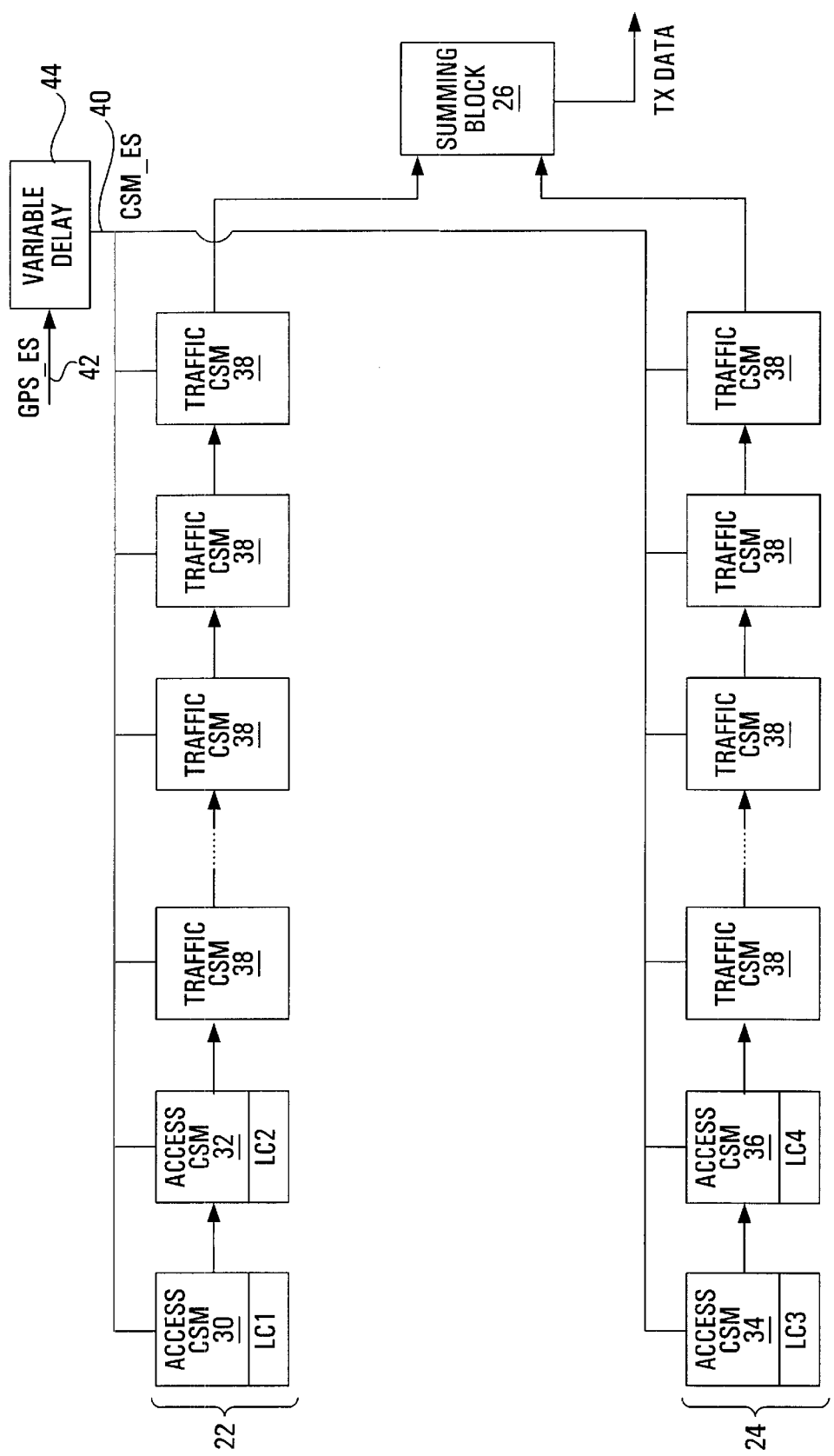
FIG. 6 is another example of an arrangement of cell site modems according to another embodiment of the invention.

FIG. 5 shows a mobile station 15 that originates a call at a distance of 224 chips (round trip distance=448 chips) from the base station 10. The access channel attempt is captured by the access CSM (32 in FIG. 3) for the ring 2 52 and the round trip delay from the perspective of the ring within which the access attempt is captured is calculated to be 64 chips. The following steps are performed to set up the traffic CSM 38:

- calculate round trip delay from the mobile origination i.e. 64+384*(n−1)=448 chips where n is the number of the ring in which the mobile accesses;
- calculate an even second offset that needs to be applied to the timing of the traffic CSM according to:
    - traffic CSM even second offset=round trip delay−512/ 2=192 chips for this example, indicated at 74 in FIG. 6. Preferably, the offset is rounded down, for example in steps of 64 chip;
- initialize the traffic CSM 38 allocated for the traffic channel with this even second offset (assuming that it is different from zero), indicated by establishing traffic acquisition window 76 starting with 192 chip even second delay, and having a range of 512 chips. The traffic acquisition window defines the traffic ring 77 for the traffic CSM. Traffic rings are in general different from the access rings, ring 1 50 and ring 2 52 (and any other access rings) and are not fixed as they are in the case of access rings, but rather depend upon the location of the mobile station 15 when it accesses the system;
- the traffic CSM 38 places its traffic demodulation search window 78 (much smaller than the traffic acquisition window 76, for example 30 chips wide) with its centre at the round trip delay;
- the traffic CSM 38 has its traffic demodulation search window 78 track the mobile station 15.

The traffic CSM 38 tracks the mobile station until the mobile station reaches the boundary of the traffic ring 77 at which point it is ready to enter another traffic ring or to be handed off to another base station. In FIG. 5, traffic demodulation window 78' represents the location of the demodulation search window when the mobile station 15 has moved to near the inner edge of its traffic ring 77. It is noted that several solutions to performing traffic handoff between cells of different base stations having large differing radii are presented in co-pending U.S. application Ser. No. 09/292, 662 filed Apr. 16, 1999 entitled "Method and Apparatus for Performing Soft Handoff Between Cells of Large Differing Radii" which shares some common inventors with this application, hereby incorporated by reference in its entirety. The variable delay block 44 has the most recent round trip delay information from the mobile station 15 and it knows which ring the mobile station 15 is about to enter, namely a ring closer to the base station 10 or a ring farther from the base station 10. The variable delay block 44 programs the offset in the CSM_ES to define a new traffic acquisition window which is centred at the current location of the mobile station 15 and sends a resync even second command to the traffic CSM 38 which then applies a corresponding additional timing advance or timing offset. The new traffic acquisition window assuming the mobile station 15 is moving closer to the base station 10 is indicated at 76' and in this case extends to the base station 10. The traffic CSM 38 searcher now tracks the mobile in a new traffic ring defined by the new traffic acquisition window 76' and establishes its traffic demodulation search window 78" at the centre of this. The resync during an ongoing call is defined herein as a radial handoff and is explained in further detail below.

The location of a traffic ring depends upon the round trip delay of the mobile station 15 from the base station 10 in case of origination in the same cell and target time of arrival of the mobile station 15 at the target base station in the case of a handoff setup. Base stations typically have built-in round trip delay tracking functionality. In case of origination in the same cell, the round trip delay to the mobile station 15 is determined after the successful reception of an access channel message and a traffic CSM 38 is assigned to handle the traffic channel. The variable delay applied to the even second signal for the traffic CSM is chosen so that the mobile station's energy falls in the centre of the traffic CSM's search window.

As indicated above, as the mobile station 15 travels towards/away from the base station 10, the mobile station's energy approaches the inner/outer edge of its traffic ring. At this time, a decision is made, for example by a radial handoff controller (which might simply be software running on a processor for example), to resynchronize the same traffic CSM 38 to a new even second offset (i.e. a new traffic ring), positioning the search window so that the mobile station's energy again falls in the centre of the range available to the traffic search window. This is shown in FIG. 5 for the case where the mobile station 15 is moving towards the base station 10.

Preferably, the radial handoff is be triggered when the mobile station's round trip delay is within a predetermined amount of the edge of the traffic search window. For example, radial handoff might be triggered when the traffic demodulation search window is less than 2 chips or greater than 462 chips within its 512 chip acquisition window. This trigger is selected to provide enough time between the trigger and the edge of the search range to complete the handoff. One chip may be used as a reasonable number for this which corresponds to 0.122 km or ~4.4 seconds at a speed of 100 km/hr. Furthermore, the trigger is selected such that the mobile station is never so close to the edge of the search window that a significant multipath can fall outside the range of the searcher.

Preferably, whenever radial handoff happens the traffic search range is moved by +/−4PNs. For example, for the example in FIG. 5 the ES offset applied to the traffic CSM is changed from 192 chips (3PN) to 0 chips (0PN) as shown in FIG. 5.

In a third embodiment, access CSMs are handled in the same manner as in either of the above described embodiments, but the traffic channel CSMs are handled differently. Dedicated traffic channel CSMs are assigned to permanent traffic rings, which might be the same as the access rings for example. In this case, when a mobile station moves from one ring to another, a handoff between different CSMs is required.

The above described examples have not dealt with the issue of sectorization, but it is to be understood that the invention applies equally to sectorized base station cells. In general, the different access or traffic areas might be complete in the sense that they are complete circles or annuluses, or alternatively might be sectors of circles or annuluses.

In the event that there are more than k different public long code masks, then a number of CSMs at least as great as the number of different public long code masks will be required in each access ring. Multiple CSMs with different long codes can be applied to the same time reference delay.

In another embodiment, a different respective public long code mask (corresponding to different access channels) and hence different long code is assigned to each access ring. In this case, a number of CSMs at least as great as the number of different public long code masks will be required. For example, as shown in FIG. 6, there are four different long codes LC1, LC2, LC3, and LC4 and a respective CSM 30,32,34,36 is assigned to search for each of these in respective circular or annular regions within the cell.

Numerous modifications and variations of the present invention are possible in light of the above teachings. It is therefore to be understood that within the scope of the appended claims, the invention may be practiced otherwise than as specifically described herein.

We claim:

1. An apparatus for providing CDMA (code division multiple access) access availability to a cell area having a centre and a radius R, comprising:

a plurality of cell site modems configured to look for access attempts generated in respective complete and/or sectorized circular and annular shaped areas centred at said centre, the areas collectively covering the cell area;

each cell site modem having a search window capable of searching over a range of distances, a first of said cell site modems being configured to look within a circle of radius W, and subsequent cell site modems being configured to look within respective annular shaped areas which are sequentially increasing in diameter; and a local clock within each cell site modem;

wherein the local clock within the first of said cell site modems is synchronized with a standard network time, and the local clock of each of the subsequent cell site modems is offset by a respective delay with respect to the standard network time which causes the cell site modem to search within said respective annular shaped area.

2. An apparatus according to claim 1 wherein said annular shaped areas are substantially non-overlapping, and are of thickness W except for an outer most annular region which is of whatever thickness is required to completely cover the cell.

3. An apparatus according to claim 1 further comprising:

a particular cell site modem available as a traffic cell site modem operable to have its traffic acquisition search window centred at a location of an access attempt.

4. An apparatus according to claim 1 further comprising:

a plurality of traffic cell site modems each having dedicated circular or annular coverage areas within said cell.

5. An apparatus according to claim 1 further comprising:

a plurality of traffic cell site modems each having dynamically reconfigurable circular or annular coverage areas.

6. An apparatus according to claim 1 wherein each of said cell site modems is configured to look for an access attempt coded with an identical long code.

7. An apparatus according to claim 1 wherein at least two of said cell site modems are configured to look for an access attempt coded with respective different long codes.

8. An apparatus according to claim 1 wherein the cell area is sectorized.

9. An apparatus for providing CDMA (code division multiple access) availability to a cell area having a centre, comprising:

a plurality of cell site modems configured to look for access attempts generated in respective complete and/or sectorized circular and annular shaped areas centred at said centre, the areas collectively covering the cell area;

a plurality of traffic cell site modems each having dynamically reconfigurable circular or annular coverage areas; and a local clock within each traffic cell site modem;

wherein the local clock within a first of said cell site modems is synchronized with a standard network time, and the local clock of each of subsequent cell site modems is offset by a respective delay with respect to the standard network time which causes the cell site modem to search within said respective annular shaped area.

10. An apparatus for providing CDMA (code division multiple access) traffic availability to a cell area having a centre comprising:

at least one cell site modem operable to look for traffic generated in respective circular or annular shaped area centred at said centre; and a local clock within each cell site modem;

wherein the local clock within each cell site modem is synchronized with a standard network time offset by a respective delay with respect to the standard network time which causes the cell site modem to search within said respective annular shaped area.

11. An apparatus according to claim 10 wherein a plurality of said cell site modems are provided, and wherein said areas are fixed and predetermined and collectively cover said cell area.

12. An apparatus according to claim 11 wherein a particular cell site modem handles a particular session until it leaves the cell.

13. An apparatus according to claim 10 wherein each cell site modem is configurable to provide traffic coverage to an arbitrary circular or annular shaped area up to a predetermined size or thickness determined by a search window width.

14. A method of providing CDMA (code division multiple access) access availability to a cell area having a centre comprising:

simultaneously searching for an access attempt in a plurality of complete and/or sectorized circular and annular areas which collectively cover said cell area by providing a respective local clock for each of the plurality of complete and/or sectorized circular and annular areas, each local clock having a respective unique offset from a standard network time, one of the offsets being zero, each of a plurality of access search windows defined with respect to a corresponding local clock thereby searching in a different one of the plurality of complete and/or sectorized circular and annular areas.

15. A method according to claim 14 wherein simultaneously searching for an access attempt in a plurality of areas which collectively cover said cell area comprises searching within a circle of radius W, and searching within annular shaped areas which are sequentially increasing in diameter.

16. A method according to claim 15 wherein said annular shaped areas are substantially non-overlapping, and are of thickness W except for an outer most annular region which is of whatever thickness is required to completely cover the cell area.

17. A method according to claim 15 further comprising establishing a traffic acquisition search window centred at a location of an access attempt.

18. A method comprising:

establishing an initial traffic acquisition search window in a cell site modem such that a mobile station's energy is substantially at the centre of the search window;

monitoring the position of a mobile station's energy within the initial traffic acquisition search window;

when the mobile station's energy becomes near an edge of the traffic acquisition search window, resynchronizing the cell site modem by positioning the search window so that the mobile station's energy again falls substantially in the centre of the range available to the traffic acquisition search window thereby performing a radial handoff.

19. A method according to claim 18 wherein establishing the initial traffic acquisition search window in the cell site modem such that the mobile station's energy is substantially at the centre of the traffic acquisition search window comprises synchronizing the cell site modem with a timing offset selected to appropriately locate the traffic acquisition search window.

20. A method according to claim 18 wherein monitoring the position of a mobile station within the initial traffic acquisition search window comprises monitoring a round trip delay between the cell site modem and the mobile station.

21. A method according to claim 20 wherein resynchronizing the cell site modem by positioning the traffic acquisition search window so that the mobile station's energy again falls substantially in the centre of the range available to the traffic search window comprises resynchronizing the cell cite modem with a timing offset selected to appropriately relocate the search window.

22. A method according to claim 20 wherein the radial handoff is triggered when the mobile station's round trip delay indicates the mobile station's energy is within a predetermined distance from the edge of the traffic acquisition search window.

* * * * *